(12) United States Patent
Parry et al.

(10) Patent No.: US 6,249,826 B1
(45) Date of Patent: *Jun. 19, 2001

(54) SYSTEM AND METHOD FOR MEDIA STATUS NOTIFICATION

(75) Inventors: William G. Parry, Bellevue; Ronald O. Radko, Kirkland, both of WA (US)

(73) Assignee: Microsoft Corporation, Redmond, WA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/837,153

(22) Filed: Apr. 14, 1997

(51) Int. Cl.[7] ........................................... G06F 3/00
(52) U.S. Cl. .............................. 710/19; 710/8; 710/48; 712/20; 711/4
(58) Field of Search .................... 710/19, 48, 8; 709/222; 369/116; 711/4; 712/20

(56) References Cited

U.S. PATENT DOCUMENTS

| | | |
|---|---|---|
| 3,729,713 | 4/1973 | Irwin . |
| 4,649,514 | 3/1987 | Berger . |
| 4,803,623 | 2/1989 | Klashka et al. . |
| 4,901,232 | 2/1990 | Harrington et al. . |
| 5,031,115 | 7/1991 | Hayashi . |
| 5,214,771 | 5/1993 | Clara et al. . |
| 5,297,067 | 3/1994 | Blackborow et al. . |
| 5,317,693 | 5/1994 | Cuenod et al. . |
| 5,386,567 * | 1/1995 | Lien et al. ........................... 713/100 |
| 5,392,269 | 2/1995 | Horie . |
| 5,497,362 | 3/1996 | Aizawa . |
| 5,530,872 | 6/1996 | Smeltzer et al. . |
| 5,548,725 | 8/1996 | Tanaka et al. . |
| 5,559,965 | 9/1996 | Oztaskin et al. . |
| 5,563,865 | 10/1996 | Wheeler . |
| 5,590,376 * | 12/1996 | Kou ......................................... 710/19 |
| 5,675,833 * | 10/1997 | Radko et al. ........................... 710/17 |
| 5,692,128 * | 11/1997 | Bolles et al. ......................... 709/200 |

(List continued on next page.)

OTHER PUBLICATIONS

Media Status Notification Support Specification for SCSI and ATAPI Devices, Version 0.1, Mar. 1996.*
Media Status Notification Support Specification, Version 1.03, Dec. 1995.*

*Primary Examiner*—Rupal Dharia
(74) *Attorney, Agent, or Firm*—Kilpatrick Stockton LLP

(57) ABSTRACT

After it is determined that a memory storage device supports media status notification (MSN), the operating system (OS) enables MSN by sending a command to the device that disables the ejection mechanism within the device. The operating system commences MSN operation using one of two alternative modes. In an Asynch mode, the OS issues a single status command to the device. The single status command is stored in a queue pending the occurrence of a media event related to the device's removable medium, such as an ejection request. After the media event occurs, the device completes the status command by altering the removable medium's status and reporting the altered status within a data packet sent to the OS. In a Polling mode, the OS periodically sends status commands to the device. The device ignores the status commands until a media event related to the device's removable medium occurs. After the media event occurs, the device completes the next status command by altering the removable medium's status and reporting the altered status within a data packet sent to the OS. After the OS receives the altered status of the removable medium, the OS is able to intelligently process the media event, such as the ejection request, without the possibility of any data loss.

33 Claims, 6 Drawing Sheets

U.S. PATENT DOCUMENTS

| | | | |
|---|---|---|---|
| 5,694,600 | * 12/1997 | Khenson et al. | 713/2 |
| 5,720,030 | 2/1998 | Kamihara et al. . | |
| 5,734,894 | * 3/1998 | Adamson et al. | 395/616 |
| 5,818,182 | * 10/1998 | Viswanadham et al. | 318/116 |
| 5,829,017 | * 10/1998 | Ohtsuka | 711/113 |
| 6,016,402 | * 1/2000 | Thomas et al. | 395/828 |

* cited by examiner

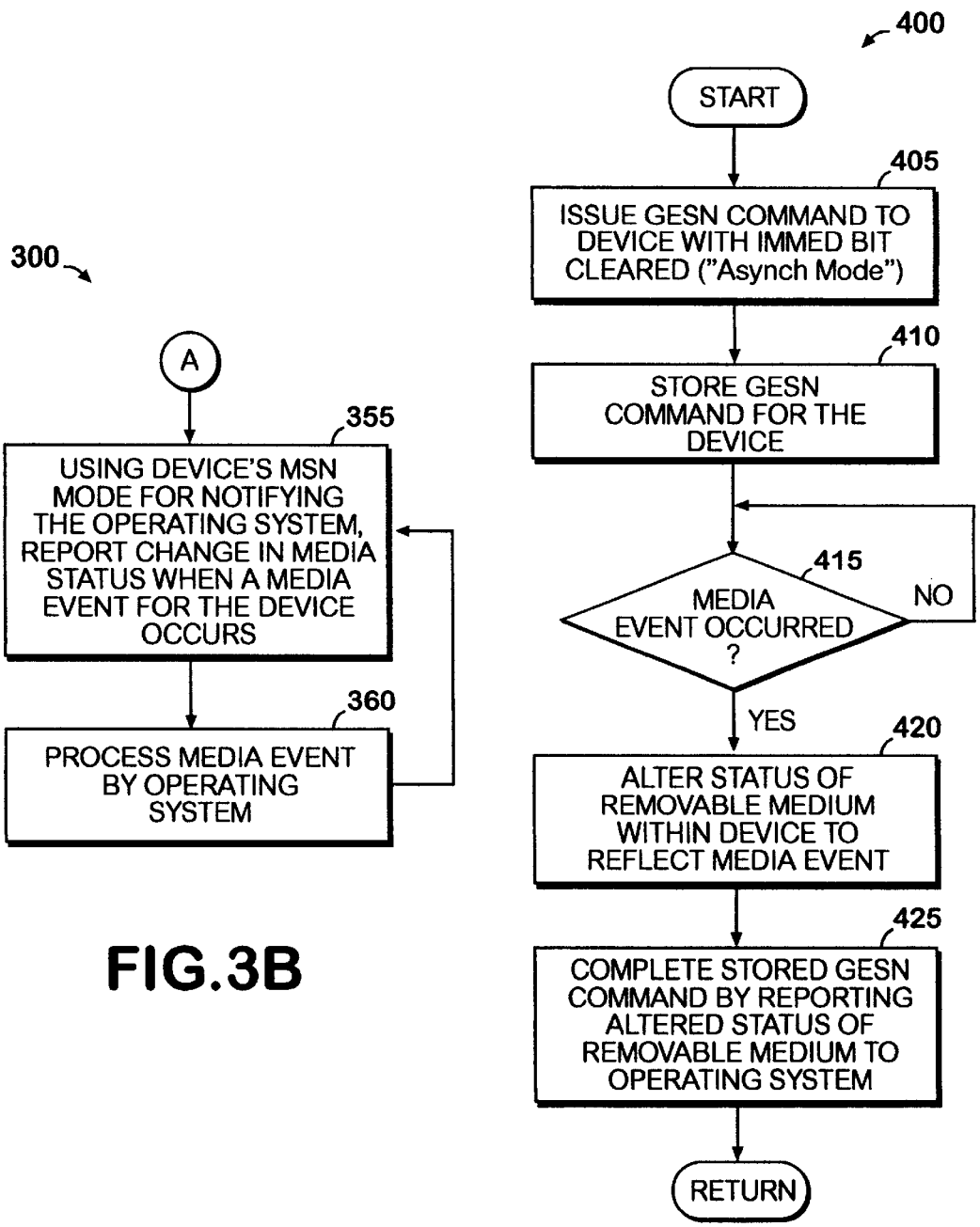

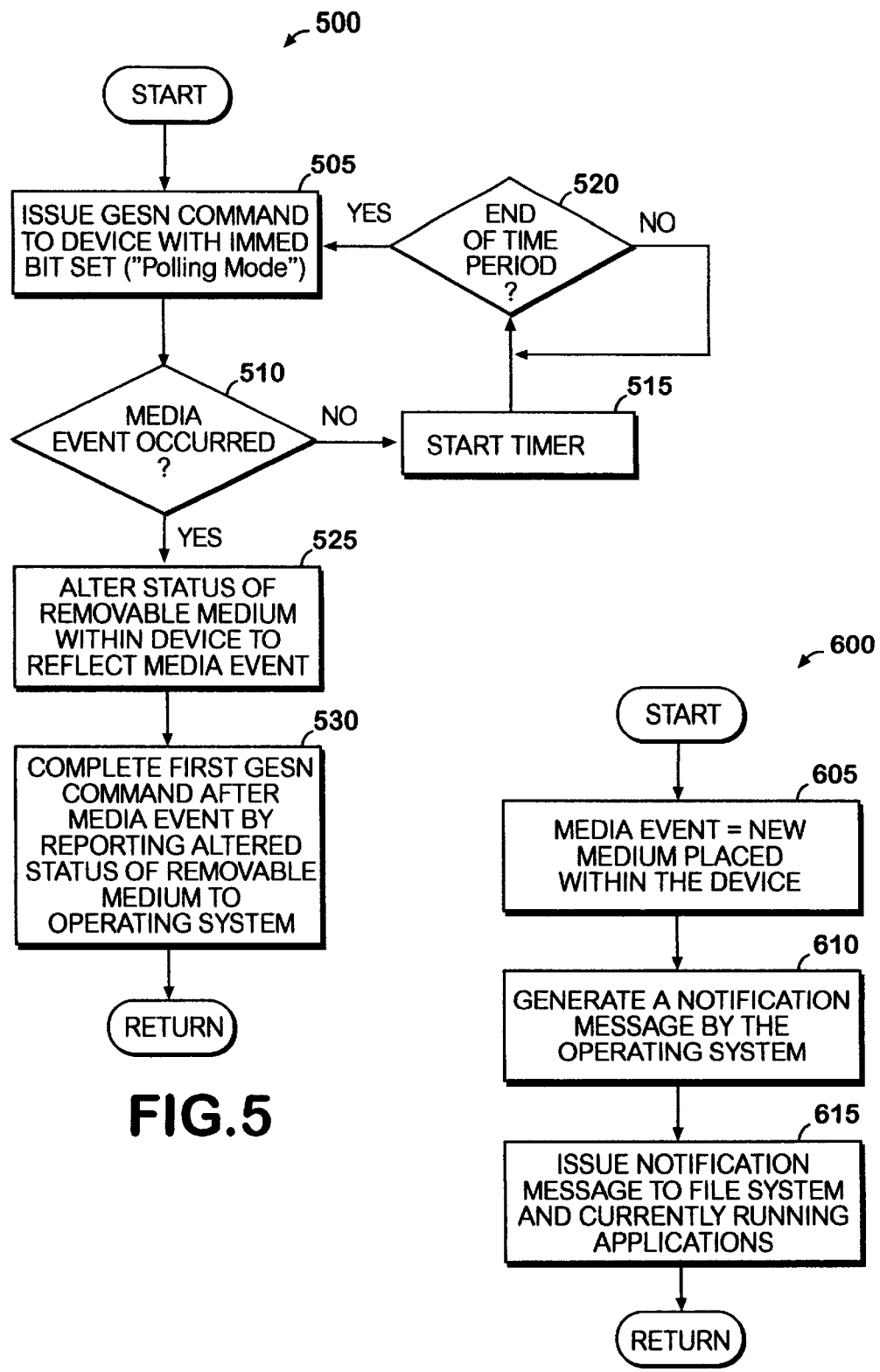

SYSTEM AND METHOD FOR MEDIA STATUS NOTIFICATION

RELATED APPLICATIONS

The present patent application is related to U.S. patent application Ser. No. 08/625,253 filed on Apr. 1, 1996, which is pending within the U.S. Patent and Trademark Office and has a common assignee and common inventor with the present patent application.

TECHNICAL FIELD

This invention generally relates to reporting a status of a removable medium in a computer and, more particularly described, relates to communicating a status of a device's removable medium from the device to the operating system.

BACKGROUND OF THE INVENTION

A trend in the personal computer industry is to equip computer systems with memory storage devices having removable media. While removable media devices have been used in computers for some time, it has only been relatively recent that high capacity removable media devices have become popular in the personal computer marketplace. For example, CD-ROM (compact disk read-only-memory) drives are now typically bundled with many personal computer systems when purchased. Another example of a removable media device is the recently introduced DVD, which is capable of holding approximately 4.7 Gigabytes of information.

A computer user can insert, remove and replace removable media within the drive. Once a removable medium is placed within the drive, the computer is then able to access and read information on the removable medium. With removable media which are read/write capable, the computer is able to write information or data to the removable medium as well. In this manner, the user is able to take advantage of the large storage capacity within a memory storage device while avoiding the inflexible nature of fixed-disk or non-removable media memory storage devices. Examples of such high capacity memory storage devices include digital tape drives, Bernoulli disk drives, and ZIP drives and JAZ drives manufactured by IOmega, Inc.

One of the problems found when using a removable medium is the potential for lost data when an ejection switch is depressed on the removable medium's drive. Many removable memory devices automatically and autonomously eject the medium when the user depresses the ejection switch or button. In some instances, the user may think the computer is finished writing data to the removable medium, while the computer may have only cached the data. In other instances, the user may have accidentally depressed the ejection switch or button on the front panel of the removable medium's drive. In both situations, any data the operating system has not saved to the medium within the drive may be lost.

Essentially, the problem is that many removable media devices are unable to asynchronously interrupt the operating system when a user intentionally or unintentionally attempts to eject the removable medium. Various locking schemes and volume tracking schemes reduce this problem, but do not eliminate it.

Locking schemes typically use a "top-down" approach to avoiding unintentional interruption or lost data. Once the removable media device is recognized by the operating system and is being used, the operating system locks the removable medium within the drive in a top-down fashion. The front panel buttons for the drive are disabled. In other words, pressing the ejection switch or button on the device is totally ignored, sometimes to the bewilderment of the user. The user is forced to know which application is using the removable medium within the drive and attempt to release the medium from the software (top) side of the equation. This often leaves users frustrated if they are not sure which applications are using the medium and may require time intensive interaction with the computer just to eject the medium.

Volume tracking schemes are another possible solution to the data loss problem. For example, some operating systems track the open media volumes being used. If the user hits the ejection switch for the drive having a removable medium being tracked as open, the drive autonomously ejects the medium while the operating system merely notes the medium is no longer there. The next time the operating system needs to access the removable medium, the operating system notes that the medium is no longer present and informs the users that the medium is no longer accessible. While this allows the operating system to find out the status of the removable medium, such volume tracking schemes still do not control the ejection process. The operating system finds out the status of the removable medium only after it is ejected from the drive. Thus, there still exists the problem of potential data loss when writing to the medium despite the ability for the operating system to track status of the medium within the drive.

Therefore, there is a need for a system for achieving an asynchronous type of media status notification (1) by devices which cannot asynchronously interrupt the operating system, (2) which minimizes communication traffic between the device and the operating system, (3) which is flexible and portable, (4) which uses a uniform method for media status notification across different bus and device implementations, and (5) which allows the operating system to control whether the removable medium should be ejected.

SUMMARY OF THE PRESENT INVENTION

The present invention satisfies the above-described needs by providing a system and method for reporting or communicating a status of a device's removable medium between the device and the operating system of a computer. In general, the present invention provides a method for reporting the status of the device's removable medium. Typically, media notification support may be enabled by disabling the device from ejecting the removable medium. This allows the operating system to control ejection of the removable medium after consideration of the removable medium's status and the on-going needs to access the removable medium.

A command, preferably a status command, is issued to the device. In response to a media event related to the removable medium, the device further processes the issued command. In one aspect of the present invention, the issued command is stored, preferably in a memory queue, waiting until the media event occurs. After the media event, the device may process the command. Storing the issued command and waiting until the media event occurs to process the issued command advantageously minimizes communication traffic to the device.

In another aspect of the present invention, the issued command is processed by the device if the media event has already occurred. Otherwise, another command is issued to the device after a predetermined period of time. In other words, commands are periodically issued to the device until the media event occurs and the next command is processed by the device.

A media event related to the removable medium can occur when an ejection request is sensed by the device or when a new medium is placed within the device as a substitute for the removable medium. More particularly described, a media event can occur when an ejection switch on the device is pressed or when a new medium is placed within the device and the device is ready to access the new medium.

The device processes the issued command by altering the status of the removable medium and then reporting the altered status in order to complete processing of the issued command. In this manner, the altered status of the removable medium may be asynchronously reported to an operating system by a device which cannot asynchronously interrupt the operating system.

The status of the removable medium may be a media status field within a data packet generated by the device. The media status field indicates whether the removable medium's status is unchanged, whether the device has sensed an ejection request, and whether a new medium has been placed within the device and is accessible by the device. The device may report the altered status of the removable medium by sending a data packet, including the media status field, to the operating system. Packet-based communications, via the data packet and related commands, allow for a flexible and portable implementation for reporting the removable medium's status. Furthermore, using such packet-based communications to report the removable medium's status provides a uniform media status notification method across different bus and device implementations.

Additionally, after the altered status is reported, the media event may be processed based upon the reported status of the removable medium. If the media event is an ejection request, the media event may be processed by issuing an ejection command to the device. The ejection command ejects the removable medium from the device. The ejection command is usually issued only if the operating system determines it is appropriate to issue the ejection command, such as when data loss will not occur. If the media event is when a new medium is within the device, the media event may be processed by generating a notification message that the new medium is within the device. By processing the media event with the operating system, as opposed to allowing the device to automatically respond to media events (such as ejection requests), the operating system is able to decisively control whether the removable device should be ejected. This advantageously avoids the problems of data loss.

The present invention also provides a computer system for communicating a status of a removable medium within a memory storage device of the computer system. The computer system includes a processor and a memory storage device coupled to the processor. The memory storage device contains the removable medium and has an ejection switch. When the ejection switch is depressed or activated, it provides an indication of a media event to the memory storage device. Additionally, the memory storage device can contain a new medium as a substitute for the removable medium. The memory storage device can also sense when the new medium is contained within the memory storage device as another indication of a media event.

Within the computer system, the processor is able to issue a prevent command to the memory storage device to disable the memory storage device from ejecting the removable medium from the memory storage device. The memory storage device is also able to receive the prevent command from the processor and disable the memory storage device from ejecting the removable medium when the ejection switch has been depressed.

The processor can also issue a status command to the memory storage device. The memory storage device is able to receive the status command from the processor and alter the status of the removable medium in response to the media event. The memory storage device is able to generate a data packet representing the altered status of the removable medium and send the data packet to the processor. The processor is capable of receiving the data packet from the memory storage device in response to the issued status command. This data packet represents the altered status of the removable medium.

Additionally, the processor is able to determine if the memory storage device is capable of generating the data packet in order to communicate the status of the removable medium.

In one aspect of the invention, the processor is able to periodically issue the status command and the memory storage device is able to alter the status of the removable medium after receiving the first status command subsequent to the media event.

In another aspect of the invention, the memory storage device is able to store the status command in a queue within the memory storage device until an indication of the media event. After storing the status command, the memory storage device is able to process the stored status command by altering the status of the removable medium in response to the media event.

Additionally, the processor can process the media event by issuing an ejection command to the memory storage device in order to eject the removable medium after receiving and processing the data packet. Alternatively, the processor can process the media event by generating a notification message that the new medium is contained within the memory storage device.

The present invention and its advantages, those described above and otherwise, will be appreciated from studying the following detailed description and drawings, and the appended claims.

BRIEF DESCRIPTION OF THE DRAWINGS

FIG. 4 is a flow diagram illustrating the preferred steps of an Asynch mode of media status notification from a device to an operating system.

FIG. 5 is a flow diagram illustrating the preferred steps of a Polling mode of media status notification from a device to an operating system.

FIG. 6 is a flow diagram illustrating the preferred steps for processing a media event when a new medium has been placed within the device.

DETAILED DESCRIPTION

An embodiment of the present invention is described for communicating a status of a removable medium within a device in response to a media event, such as when an ejection switch is depressed on the device. Traditionally, devices have to asynchronously interrupt the operating system in order to provide timely media status notification. However, in an embodiment of the present invention, the device is able to respond to a previously issued status command when a media event occurs. The status of the removable medium is altered and reported to the operating system so that the operating system can decide the appropriate way to process the media event. For example, if the media event occurs because the ejection switched is depressed on the device, the operating system is able to determine if it is appropriate to eject the medium based on the reported status of the medium. In this manner, the device can achieve timely media status notification to the operating system event if the device does not support asynchronous interrupts to the operating system. Furthermore, this allows the operating system to control whether the removable medium should be ejected and to preclude undesirable data loss.

The preferred embodiment of the present invention is represented by an enhanced version of an operating system called "WINDOWS 95" developed by Microsoft Corporation of Redmond, Wash. Briefly described, the "WINDOWS 95" operating system has a layered architecture for communicating information between a program module and a physical memory storage device. A Media Status Notification Management Layer within the enhanced "WINDOWS 95" operating system provides a packet-based implementation for communicating the status of a device's removable medium between the operating system and the device. Commands are sent by the operating system from this layer and the device responds at the appropriate time based on a specific media event, such as an ejection request. This aspect of reporting and communicating the status of the device's removable medium is the focus of the present invention.

Figure 1:
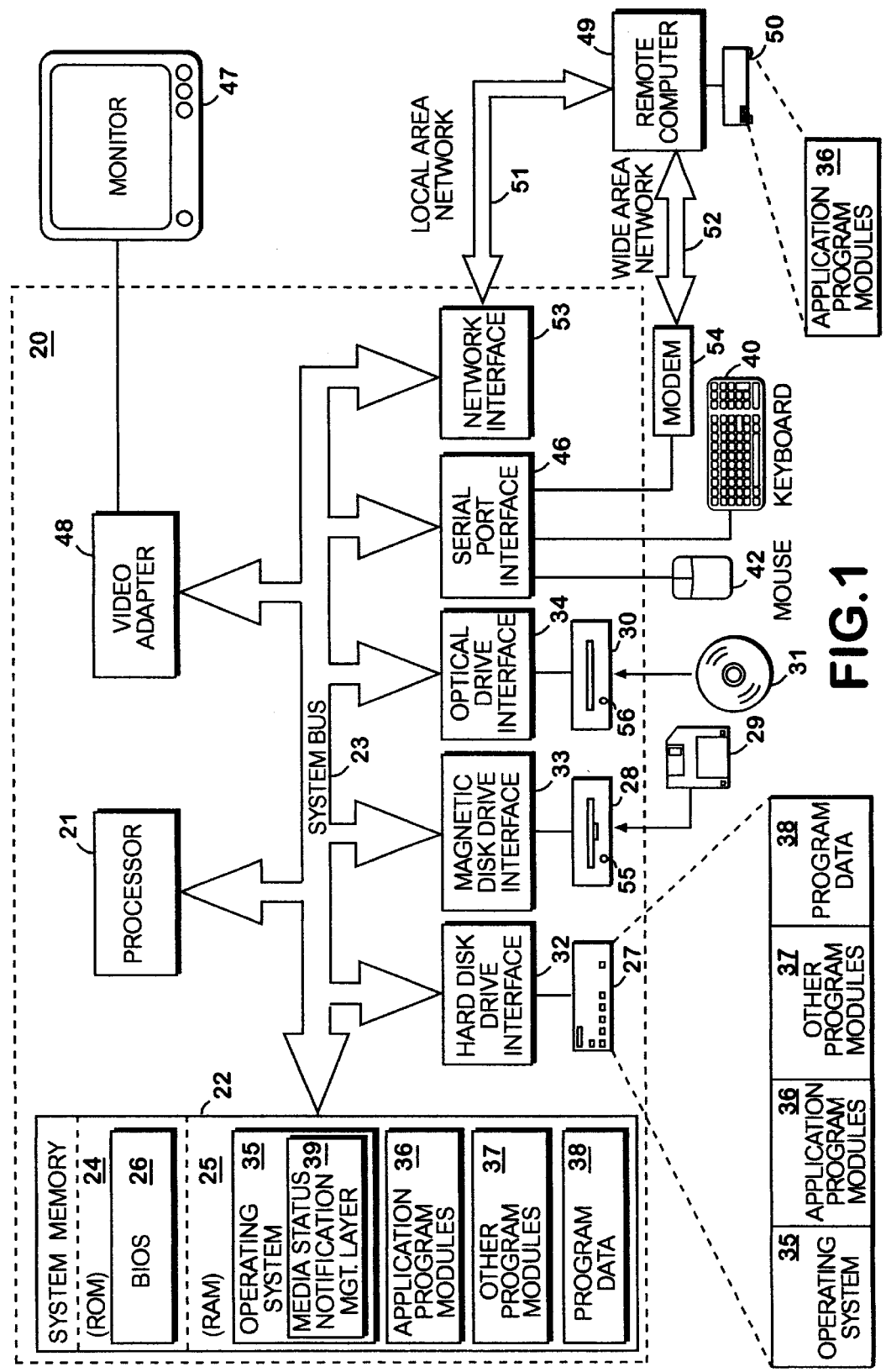
FIG. 1 is a block diagram of a personal computer that provides an exemplary operating environment for an embodiment of the present invention.
Figure 2:
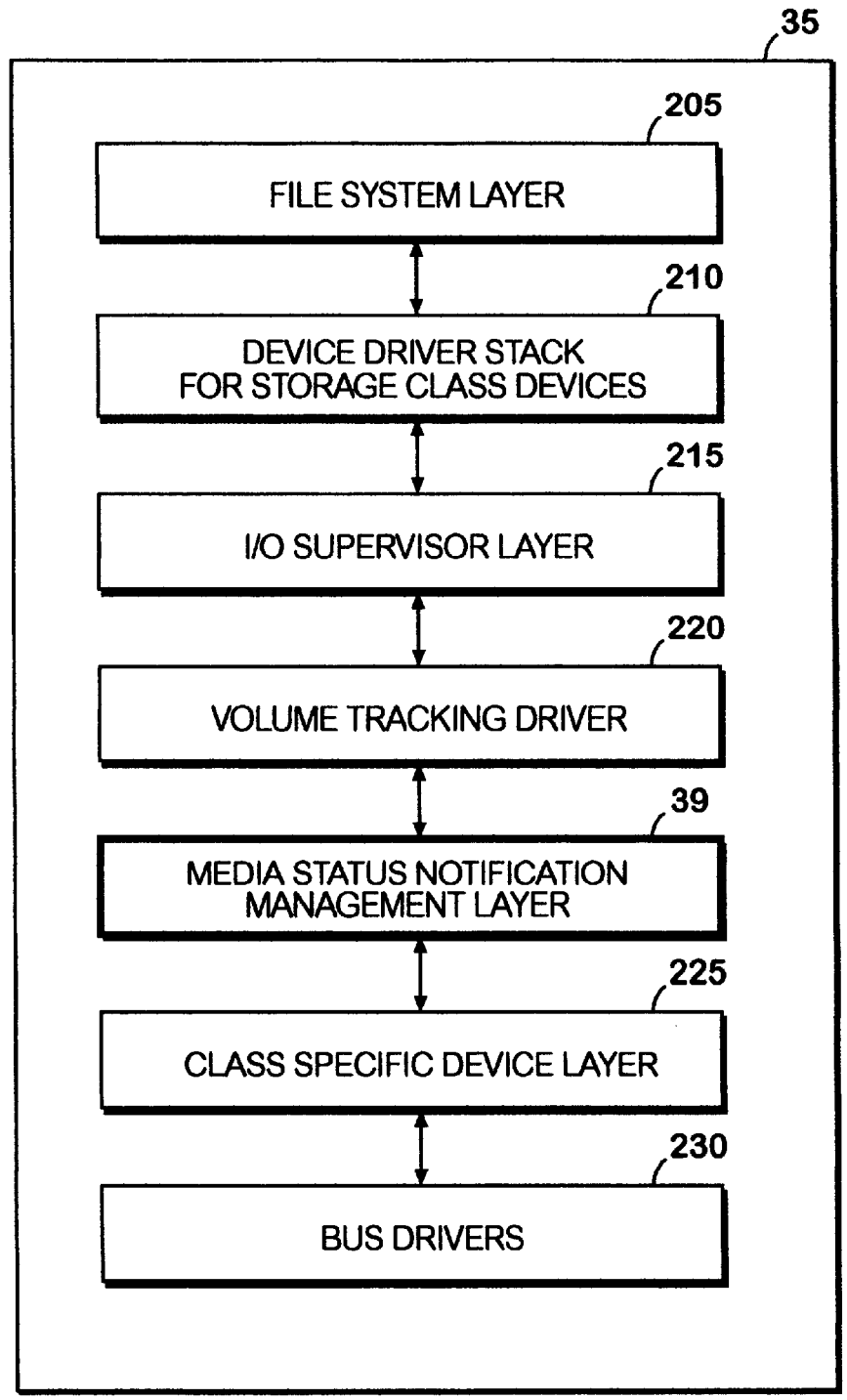
FIG. 2 is a diagram illustrating the layered architecture of the operating system in an exemplary embodiment of the present invention.
Figure 3A:
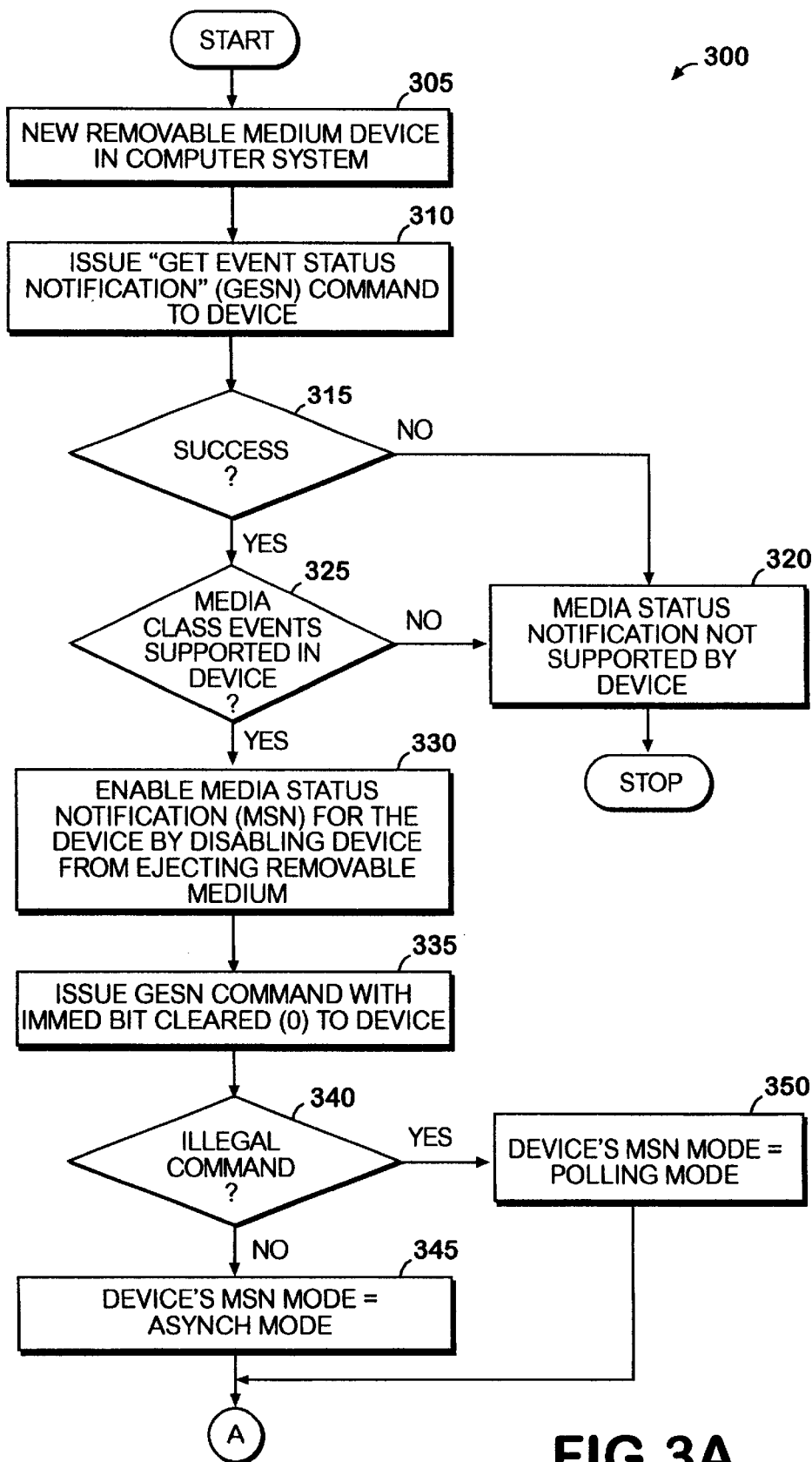
FIG. 3, consisting of FIG. 3A and FIG. 3B, is a flow diagram illustrating the general steps for enabling and operating media status notification in accordance with an exemplary embodiment of the present invention.
Figure 7:
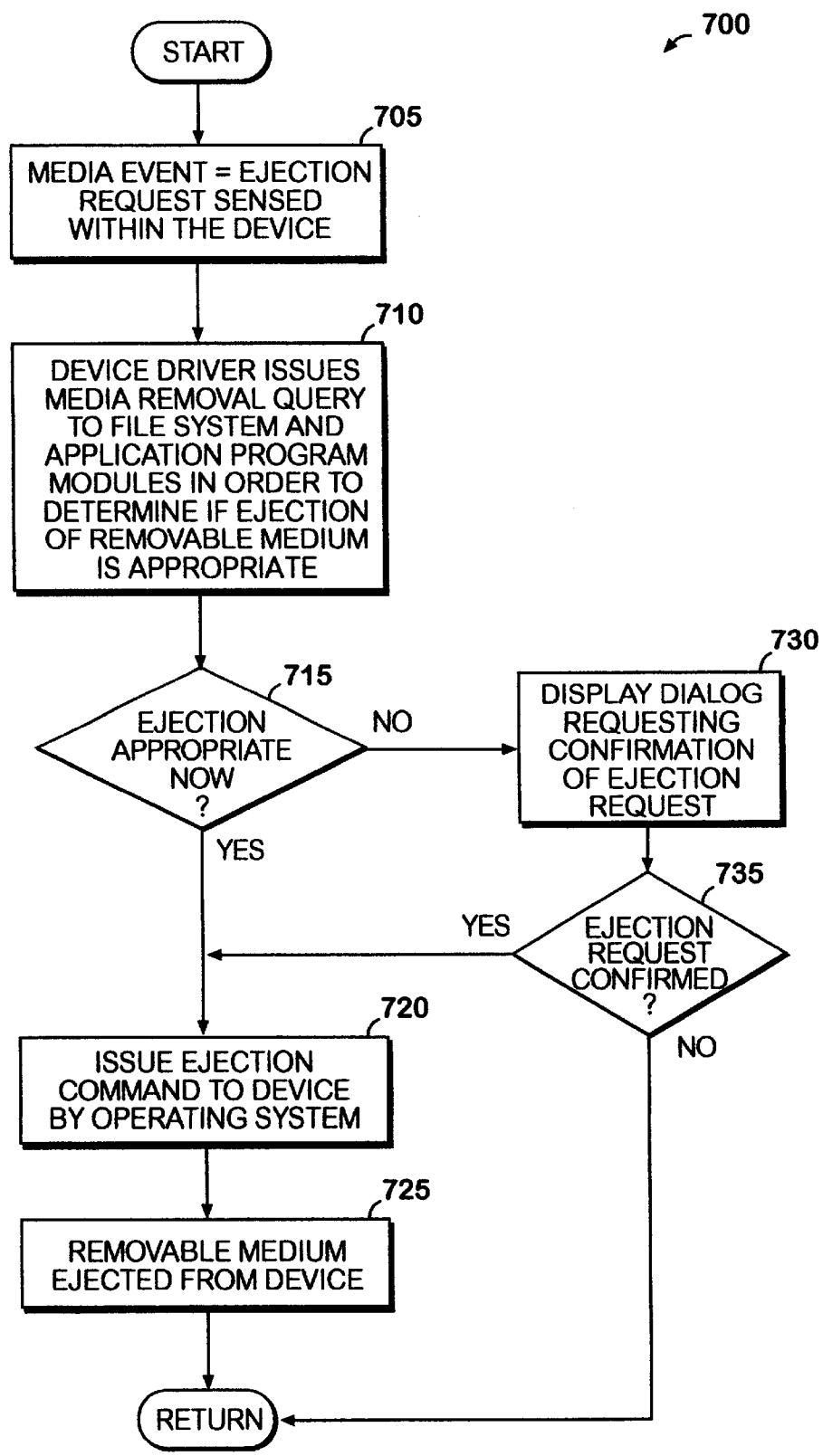
FIG. 7 is a flow diagram illustrating the preferred steps for processing a media event when an ejection request is sensed by the device.

In FIG. 1, the operating environment for an embodiment of the present invention is illustrated. FIG. 2 illustrates layers within the exemplary operating system used for communicating the status of a device's removable medium. FIGS. 3A–3B are flow diagrams illustrating the general steps for communicating a status of a removable medium within a device in accordance with an exemplary embodiment of the present invention. FIGS. 4–5 are detailed flow diagrams describing alternative modes of media status notification. FIGS. 6–7 are detailed flow diagrams describing how different types of removable media events are processed by the operating system once the removable medium's status is reported by the device.

The detailed description which follows is represented largely in terms of processes and symbolic representations of operations by a conventional computer. The processes and operations performed by the computer include the manipulation of signals by a processor and the maintenance of these signals within data packets and data structures resident in one or more media within memory storage devices. Generally, a "data structure" is an organizational scheme applied to data or an object so that specific operations can be performed upon that data or modules of data so that specific relationships are established between organized parts of the data structure. A "data packet" is type of data structure having one or more related fields, which are collectively defined as a unit of information transmitted from one device or program module to another. Thus, the symbolic representations of operations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to representations of these signals as bits, bytes, words, information, data, packets, nodes, numbers, points, entries, objects, images, files or the like. It should be kept in mind, however, that these and similar terms are associated with appropriate physical quantities for computer operations, and that these terms are merely conventional labels applied to physical quantities that exist within and during operation of the computer.

It should be understood that manipulations within the computer are often referred to in terms such as issuing, sending, altering, adding, disabling, determining, comparing, reporting, and the like, which are often associated with manual operations performed by a human operator. The operations described herein are machine operations performed in conjunction with various inputs provided by a human operator or user that interacts with the computer.

In addition, it should be understood that the programs, processes, methods, etc. described herein are not related or limited to any particular computer or apparatus, nor are they related or limited to any particular communication architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Referring now to the drawings, in which like numerals represent like elements throughout the several figures, aspects of the present invention and a suitable operating environment will be described.

The Exemplary Operating Environment

FIG. 1 and the following discussion are intended to provide a brief, general description of the suitable computing environment in which the invention may be implemented. While the invention will be described in the general context of an application program that runs on an operating system in conjunction with a personal computer, those skilled in the art will recognize that the invention may also be implemented in combination with other program modules. Generally, program modules include routines, programs, components (such as stacks or caches), data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communication network. In a distributed computing environment, program modules may be located in both local and remote memory storage devices.

Referring now to FIG. 1, an exemplary system for implementing the present invention includes a conventional personal computer 20, including a processor 21, a system memory 22, and a system bus 23 that couples the system memory 22 to the processor 21. The system memory 22 includes read only memory (ROM) 24 and random access memory (RAM) 25. A basic input/output system 26 (BIOS) is stored in ROM 24. The BIOS 26 essentially contains the basic routines that help to transfer information between elements within the personal computer 20 during certain computer operations, such as during start-up. The personal computer 20 further includes a hard disk drive 27, a magnetic disk drive 28 (e.g., that reads from and writes to a removable disk 29), and an optical disk drive 30 (e.g., that reads from an optical disk 31 or reads from or writes to other optical media). The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage for the personal computer 20. Although the description of computer-readable media above includes the hard disk drive 27, a removable magnetic disk 29 and a removable optical disk 31, such as a CD-ROM disk or DVD, it should be appreciated by those skilled in the art that other types of removable media which are readable by a computer, such as magnetic cassettes, flash memory cards, digital tapes, Bernoulli cartridges, and the like, may also be used in the exemplary operating environment.

The magnetic disk drive 28 and the optical disk drive 30 are also referred to as removable media devices, each having ejection switches 55, 56 typically located on their respective front panels. A user typically depresses a drive's ejection switch 55, 56 in order to indicate the user wants to eject media from within the drive. As one skilled in the art will appreciate, each of the removable media devices 28, 30 has an ejection mechanism (not shown) used to eject media 29, 31 from the device. In an embodiment of the present invention, these removable media devices 28, 30 are capable of disabling their respective ejection mechanisms. Once disabled, these removable media devices 28, 30 are prevented from ejecting their media 29, 31 when the user depresses the respective device's ejection switch 55, 56.

Although not shown in FIG. 1, the optical disk drive 30 may be a changer type of memory storage device capable of maintaining more than one optical disk 31. An example of such a changer type of memory storage device is a conventional "juke box" type of optical disk drive 30. As a conventional changer device, the optical disk drive 30 may support individual slot load and unload for each removable medium within the drive 30. Alternatively, the optical disk drive 30 may support a cartridge load mechanism where all of the removable media are inserted into a single cartridge before being placed within the drive 30.

A number of program modules may be stored in the drives and RAM 25, including an operating system 35, one or more application program modules 36, other program modules 37, and program data 38 used by program modules. The operating system 35 preferably has a layered architecture including a Media Status Notification Management Layer 39. The Media Status Notification Management Layer 39 is the module supporting communication of a removable medium's status (such as the status of the removable optical disk 31) from a memory storage device (such as the optical drive 30) to the operating system 35.

The operating system 35, in conjunction with the BIOS 26 and associated device drivers, provides the basic interface between the computer's hardware and software resources, the user, and program modules, such as the application program modules 36. A user may enter commands and information into the personal computer 20 through a keyboard 40 and an input or pointing device, such as a mouse 42. Other input devices (not shown) may include a microphone, a joystick, a game pad, a satellite dish, a scanner, or the like. These and other input devices are often connected to the processor 21 through a serial port interface 46, such as a game port or a universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote programmable devices, such as a remote computer 49. The remote computer 49 may be a server, a router, a peer device, or other common network node. Typically, the remote computer 49 includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the global Internet.

When used in a LAN networking environment, the personal computer 20 is connected to the local network 51 through a network interface 53. When used in a WAN networking environment, the personal computer 20 typically includes a modem 54 or other means for establishing communications over the wide area network 52, such as the global Internet. The modem 54, which may be internal or external, is connected to the system bus via the serial port interface 46. In a networked environment, program modules depicted relative to the personal computer 20, or portions thereof, may be stored in the remote memory storage device 50. It will be appreciated that the network connections shown are exemplary and other means of establishing a communications link between the personal computer 20 and the remote computer 49 may be used.

As discussed earlier, the preferred embodiment of the present invention is embodied in an enhanced version of Microsoft Corporation's "WINDOWS 95" operating systems. However, it should be understood that the invention can be implemented for use with other operating systems, such as Microsoft Corporation's "WINDOWS NT" operating system, IBM Corporation's "OS/2" operating system, SunSoft's "SOLARIS" operating system used in workstations manufactured by Sun Microsystem, Hewlett-Packard's "HP-UX" operating system, and the operating system used in "MACINTOSH" computers manufactured by Apple Computer, Inc.

Likewise, those skilled in the art will appreciate that the Media Status Notification Management Layer 39 provides a wide variety of features and functions in addition to aspects described below with respect to an embodiment of the present invention.

Layers within the Operating System

FIG. 2 is a diagram highlighting the layered architecture within the exemplary operating system 35. In an exemplary embodiment of the present invention, these layers interact with each other and with devices within the personal computer 20 when communicating a device's removable medium status.

Referring now to FIGS. 1 and 2, the operating system 35 has a multi-layered architecture which offers a great deal of flexibility. Different layers can be loaded or installed into the operating system 35 depending on the devices attached to the personal computer 20. At the top of the layered operating system 35 is a file system layer 205. The file system layer 205 fields requests from application program modules 36 and translates those requests into messages called I/O packets. Once a request is translated into an I/O packet, the I/O packet is sent to a Device Driver Stack 210 for storage class devices, such as a magnetic disk drive 28 or a optical disk drive 30.

The Device Driver Stack 210 is created by an I/O Supervisor Layer 215 when the personal computer 20 initially boots. The I/O Supervisor Layer 215 is a binary component within the operating system 35 that loads drivers onto the Device Driver Stack 210 once a particular device is sensed within the personal computer 20. Additionally, the I/O Supervisor Layer 215 is responsible for setting up memory allocations, determining physical memory addresses, and associating devices with requests for devices. Thus, the I/O packet is processed by the appropriate device driver within the Device Driver Stack 210 before being associated with the appropriate device in the I/O Supervisor Layer 215.

Below the I/O Supervisor Layer 215 is a Volume Tracking Driver 220, which further processes the I/O packet. The Volume Tracking Driver 220 is used for managing removable media devices, such as the optical disk drive 31. The Volume Tracking Driver 220 ensures that the removable medium in the device is the medium that the I/O packet actually refers to. Thus, the Volume Tracking Driver 220 is able to indicate that the removable medium (e.g., the optical disk 31) has changed within the device (e.g., the optical disk drive 30) since the device was last accessed. However, the Volume Tracking Driver 220 is still not able to solve the problems of inadvertent or premature removal of the removable medium from within the device.

A new layer within the operating system 35, called the Media Status Notification Management Layer 39, solves this problem by issuing commands to removable media devices and controlling when the removable medium should appropriately be ejected from the device. Thus, the Media Status Notification Management Layer 39 protects the file system layer 205 from having data that must be written to the removable medium when the removable medium is already gone from within the removable media device. In this manner, the Media Status Notification Management Layer 39 ensures that the proper removable medium is still present and accessible in order to process the I/O packet.

Below the Media Status Notification Management Layer 39, the I/O packet is further routed and processed on its way to the desired device by a Class Specific Device Layer 225 and a Bus Driver 230. For example, if the I/O packet is for a optical disk drive 30, the Class Specific Device Layer 225 would include an optical disk drive class binary. This binary provides the necessary information on how to communicate to specific devices, such as the optical disk drive 30. The I/O packet is then forwarded down to the Bus Driver 230, which provides the necessary information on how to communicate with the type of interface (e.g., the optical drive interface 34) connected to the removable media device.

In addition, the Class Specific Device Layer 225 and the Bus Driver 230 are operative to forward messages or packets from the device to the Media Status Notification Management Layer 39. The capacity of a device to report the status of the device's removable medium to the Media Status Notification Management Layer 39 (called supporting media status notification) is important to the embodiment of the present invention. The operating system's 35 ability to intelligently respond to reported changes in the removable medium's status is also important to the embodiment of the present invention.

From this brief description, it should be appreciated that operating systems, such as the "WINDOWS 95" operating system, are quite complex and provide a wide variety of services that allow users and programs to utilize the resources available in the personal computer. Those skilled in the art will be familiar with operating systems and their various features. For more comprehensive information regarding the "WINDOWS 95" operating system and its layered and installable architecture, the reader may refer to any of a variety of publications, including the "Win32 Programmer's Reference" and "Inside Windows 95" by Adrian King, both published by Microsoft Press.

Enabling and Operation of Media Status Notification

FIG. 3, comprising FIG. 3A and FIG. 3B, is a flow diagram illustrating the general steps for enabling and operating media status notification in accordance with an exemplary embodiment of the present invention. Referring now to FIGS. 1, 2, and 3A, the method 300 begins at step 305 when a new removable media device is sensed within the personal computer system 20. This may occur when the computer system 20 initially boots or in a "hot-docking" situation. A "hot-docking" situation arises when the computer system 20 has initially booted and a new device is added after bootup.

At this point, the operating system 35 must determine if the device supports media status notification ("MSN") in order to appropriately amend the Device Driver Stack 210 to reflect the new device. At step 310, the operating system 35 begins this determination process by issuing a GET EVENT STATUS NOTIFICATION ("GESN") command to the new device.

The GESN command is preferably a packet command having a variety of fields. One of the fields is a Notification Class field. The Notification Class field designates a type of event the operating system 35 desires to be reported in response to the GESN command. Examples of types of events include media events related to the device's removable medium, such as when a new medium is within the device or when an ejection request is generated. Thus, the GESN command issued at Step 310 preferably designates "media events" within the Notification Class field so that a response from the device relates specifically to media events.

At step 315, if the device cannot successfully respond to the issued GESN command, step 315 proceeds to step 320 where it is determined that MSN is not supported by the device and the method 300 ends for the device. This may occur if the device is of a type which cannot interpret the issued GESN command. However, if the device can successfully respond to the issued GESN command, step 315 proceeds to step 325.

At step 325, if the response from the device indicates that the device is capable of reporting the status of the device's removable medium, step 325 proceeds to step 330. However, if the response from the device indicates that the device is incapable of reporting the removable medium's status, step 325 proceeds directly to step 320.

In the preferred embodiment, the response from the device includes a header. Within the header is a Supported Event Classes Field associated with the Notification Class field in the issued GESN command. If the Notification Class field designates "media events" in the issued GESN command at step 310, the Supported Event Classes field in the device's response indicates whether the device is capable of supporting media class events. In other words, if the device is able to alter a removable medium's status after a media event occurs and report the status to the operating system 35, then media class events are supported by the device.

At step 330, the operating system 35 is aware that the device is capable of supporting MSN. Accordingly, the operating system enables MSN for the device by disabling the device from automatically ejecting the removable medium. This is preferably accomplished by issuing a PREVENT command by the operating system 35 to the device. The PREVENT command establishes what is called a persistent lock condition within the device. The persistent lock is a condition where the device itself is prevented from autonomously ejecting the removable medium from the device in response to the user depressing an ejection switch on the device. When the operating system 35 uses the PREVENT command in conjunction with the GESN command, the operating system 35 is able eject media from the device only when appropriate to prevent data loss. For example, the optical disk drive 30 is placed in such a persistent lock condition. As a result, the optical disk drive 30 is prevented from automatically and autonomously ejecting the optical disk 31 when the user depresses the ejection switch 56. This prevents the optical disk 31 from being ejected with data-filled (dirty) file buffers within the file system layer 205 of the operating system 35.

The PREVENT command is a packet command supported by the removable media device. The PREVENT command has a PERSISTENT bit field and a PREVENT bit field. The value of the PERSISTENT bit field controls whether the effects of the PREVENT command will persist until the device receives another PREVENT command, a bus reset or a power reset. The value of the PREVENT bit field controls whether the device is prevented from ejecting its removable medium or is allowed to eject its removable medium.

When the PERSISTENT bit and PREVENT bit are set within their respective fields in the PREVENT command, the removable media device disables its ejection mechanism for ejecting the removable medium. The removable medium remains locked in the device until the operating system issues an EJECTION command or the PERSISTENT bit and PREVENT bit are reset. The resulting condition is known as a persistent lock condition. However, it is important to understand that setting the PERSISTENT bit and PREVENT bit does not prevent the operating system 35 from issuing an EJECTION command to actuate the device's ejection mechanism.

After step 330, MSN operation commences once the device is MSN-enabled. In general, steps 335–350 determine a particular mode for MSN operation supported by the device. According to the appropriate mode of MSN operation, the operating system 35 issues a status command (e.g., more particularly defined as a GESN command) to the device at step 355 and the device completes the status command after a media event has occurred. There are two embodiments or modes of MSN operation implemented with the present invention: an Asynch mode and a Polling mode.

The Asynch mode of MSN operation is the preferred way to communicate a removable medium's status from a device.

In the Asynch mode, a single status command is sent to the device. The device stores the command in memory pending an occurrence of a media event. Once the media event occurs, the stored status command is then completed by altering the status of the removable medium and reporting the new status reflecting the media event. Additional details about the Asynch mode of MSN operation are discussed below with regard to FIG. 4.

The Polling mode of MSN operation is used when the device does not support the Asynch mode. In the Polling mode, a status command is periodically sent to the device. The device essentially ignores the issued status commands from the operating system 35 until a media event occurs. The first status command received after a media event has occurred is completed by the device. As in the Asynch mode, the device completes the status command by altering the status of the removable medium and reporting the new status reflecting the media event. Additional details about the Polling mode of MSN operation are discussed below with regard to FIG. 5.

At step 335, the operating system 35 issues a GESN command to the device. The issued GESN command has an IMMED bit field which has been cleared. The IMMED bit field of the GESN command indicates whether the GESN command is requesting the status of the removable media device using the Asynch mode or the Polling mode. In other words, the IMMED bit of the GESN command can be set or cleared depending on the desired mode of MSN operation used. If the IMMED bit is cleared, as in step 335, the mode of MSN is the Asynch mode. However, if the IMMED bit is set, the mode of MSN is the Polling mode.

At step 340, if the device returns a response indicating that the issued GESN command from step 335 is an illegal command, then step 340 proceeds to step 350 where it is determined that the device's MSN mode is the Polling mode. The command is deemed an illegal command if the device is incapable of storing the issued GESN command in a queue pending a media event. In other words, if the command from step 335 fails, the device is not able to support the Asynch mode of MSN operation. After step 350, the method 300 proceeds to step 355 on FIG. 3B.

However, if the response indicates the issued GESN command from step 335 is not an illegal command, step 340 proceeds to step 345 because it is determined that the device's MSN mode is the preferred Asynch mode of MSN operation. After step 345, the method 300 proceeds to step 355 on FIG. 3B.

Referring now to FIGS. 1, 2, 3A, and 3B, at step 355 the device reports a change to the operating system 35 in media status after a media event related to the removable medium occurs. This is performed in accordance with the device's MSN mode after the media event occurs. Examples of media events related to the removable medium include a new media event, an ejection request event, and a media removal event.

A new media event occurs when another removable medium (new medium) is within the device as a substitute for the current removable medium, preferably after the device can access the new medium.

An ejection request event occurs when an ejection request is sensed by the device. For example, ejection requests are typically sensed by the optical disk drive 30 when the ejection switch 56 is pressed by the user. However, in the preferred embodiment, if the user presses the ejection switch 56 without a disk 31 present in the drive 30, the drive 30 ignores the pressed ejection switch 56 and is deemed not to have sensed an ejection request.

A media removal event occurs when the removable medium has been removed from the device or the device is unable to access the medium without some kind of user intervention.

These types of media events are indicated from media status return data sent from the device to the operating system 35. The device sends the media status return data in order to complete the GESN command (i.e., the stored GESN command under the Asynch mode or the first GESN command issued after the media event under the Polling mode). The media status return data is preferably a data packet having a media status field. It is the contents of the media status field which are altered by the device to reflect the medium's status in response to the occurrence of a media event. For example, if MSN is enabled for the optical disk drive 30 and the user presses the ejection switch 56 on the drive 30, the following will take place:

1. the optical disk 31 will not automatically be ejected because of the persistent lock condition within the optical disk drive 30, and
2. the optical disk drive 30 will complete a GESN command by altering the media status field in the media status return data before the drive 30 sends the data packet with the media status return data to the operating system 35.

If the device is a changer type of memory storage device, an embodiment of the present invention accommodates this situation with additional fields within the media status return data. As previously mentioned, a changer type of memory storage device is capable of maintaining more than a single removable medium. Each removable medium within the changer device is assigned to a designated slot number within the changer device. To accommodate such a situation, the media status return data preferably has a start slot field and an end slot field. The start slot field and the end slot field define a range of removable media associated with the media event.

In particular, the content of the start slot field defines the first slot within the changer device affected by the media event. Similarly, the content of the end slot field defines the last slot within the changer device affected by the media event. Thus, if a single removable medium in only one slot of the changer device is affected by the media event, the content of the start slot field and the content of the end slot field will be the same.

Referring still to FIGS. 1, 2, 3A, and 3B, at step 355, the device notifies the operating system 35 of the current status of the removable medium within the device without having to support asynchronous interrupting of the operating system 35. Once the operating system 35 has been notified, the operating system 35 is able to intelligently process the media event at step 360 by determining the appropriate response to the media event.

The appropriate response by the operating system 35 is based upon the type of media event reflected by the altered media status. If the media event is a media removal event, the operating system 35 typically notifies the file system 205 of the removal event via a message to the file system layer 205.

If the media event is a new media event, the operating system 35 typically informs the file system layer 205 and the application program modules 36 about the new medium within the device. Additional details about how the operating system 35 processes an ejection request event are discussed below with regard to FIG. 6.

If the media event is an ejection request, the operating system 35 typically issues an EJECTION command to the device unless data has yet to be written to the removable medium or an application program module still needs access to the removable medium. Additional details about how the operating system 35 processes an ejection request event are discussed below with regard to FIG. 7.

In summary, using an embodiment of the present invention, the device is able to notify the operating system 35 in a "bottom-up" fashion (initiated by media events in the device) where the operating system 35 is then able to intelligently make processing decisions based upon the reported media status. After the operating system 35 processes the media event, step 360 proceeds back to step 355 to report the next change in the removable medium's status due to the next media event.

Asynch Mode of Media Status Notification

As described above, FIGS. 3A and 3B illustrate the general steps for enabling and operating media status notification in an embodiment of the present invention. One of the steps, namely step 355 on FIG. 3B, generally describes reporting a device's removable media status to the operating system 35 after a media event for the device occurs. FIGS. 4 and 5 illustrate detailed steps further describing step 355 of FIG. 3B for each of the different MSN modes of operation.

FIG. 4 is a flow diagram illustrating the preferred steps of the Asynch mode of MSN operation. The Asynch mode is preferred over the Polling mode because the Asynch mode generally issues fewer GESN commands than that of the Polling mode. As a result, the operating system 35 is advantageously not required to waste time issuing commands that will never be completed.

Referring now to FIGS. 1–4, the method 400 begins at step 405 where a GESN command having the IMMED bit cleared is issued to a memory storage device (such as the optical disk drive 30). When the IMMED bit is cleared, the mode for media status notification is the Asynch mode. At step 410, the GESN command issued at step 405 is stored in memory pending the occurrence of a media event associated with the device at step 415. In the preferred embodiment, the GESN is stored in a queue associated with the device. Essentially, the queue is a temporary memory storage element within the device.

At step 415, if a media event occurs (such as when the ejection switch 56 on the optical disk drive 30 is pressed), step 415 proceeds to step 420. Otherwise, the GESN command remains stored in memory waiting for the occurrence of a media event at step 415.

At step 420, the device processes the GESN command by altering the status of the removable medium to reflect the media event that just occurred. In the exemplary embodiment, a data packet, called the media status return data, is generated by the device reflecting the altered status of the removable medium in a media status field of the data packet.

At step 425, the stored GESN command is completed by reporting the altered status of the removable medium from the device to the operating system 35. In the exemplary embodiment, the device sends the data packet to the processor 21 running the operating system 35 in order to communicate the status of the removable medium to the operating system 35. After the device processes the GESN command in response to the media event, the next GESN command with IMMED bit cleared is queued pending the next media event.

In summary, the Asynch mode of MSN operation is the preferred method for reporting and communicating a removable medium's status from a device to the operating system 35. In an example where the optical disk drive 30 supports the Asynch mode, the drive 30 completes the stored GESN command after the user presses the ejection switch 56 on the optical disk drive 30. The drive 30 alters the contents of the media status field to reflect the drive's ejection request and reports the altered media status in a data packet sent to the operating system 35.

Polling Mode of Media Status Notification

FIG. 5 is a flow diagram illustrating the preferred steps of the Polling mode of MSN operation. As previously mentioned, the Polling mode is typically used in an embodiment of the present invention when the device cannot support storing a status command pending an occurrence of a media event (i.e., the preferred Asynch mode). The Polling mode advantageously provides a degree of flexibility when dealing with a heterogeneous set of devices connected to the computer system 20, not all of which support the Asynch mode.

Referring now to FIGS. 1–3B and 5, the method 500 begins at step 505 where a GESN command having the IMMED bit set is issued to a memory storage device (such as the optical disk drive 30). When the IMMED bit is set, the mode for media status notification is Polling.

At step 510, if a media event occurs (such as when the ejection switch 56 on the optical disk drive 30 is pressed), step 510 proceeds to step 525. Otherwise, no media event has occurred and step 510 proceeds to step 515.

At step 515, a timer is started before proceeding to step 520. The timer is set for a predetermined time period. The predetermined time period is preferably two seconds based upon an empirically determined minimum time in which a user can change removable media within a drive. At step 520, if the timer is at the end of the time period, then step 520 proceeds to step 505 where another status command (e.g., another GESN command with IMMED bit set) is issued to the device. In this manner, a status command is periodically issued to the device via steps 505-520 until a media event occurs.

At step 525, the device processes the first GESN command issued after the media event by altering the status of the removable medium to reflect the media event that just occurred. In the exemplary embodiment, a data packet, called the media status return data, is generated reflecting the altered status of the removable medium in a media status field of the data packet.

At step 530, the first GESN command issued after the media event is completed by reporting the altered status of the removable medium from the device to the operating system 35. In the exemplary embodiment, the device sends the data packet to the processor 21 executing the operating system 35 in order to communicate the status of the removable medium to the operating system 35.

In summary, the Polling mode of MSN operation periodically issues a status command until a media event occurs. Upon the media event, the removable medium's status is reported from the device to the operating system 35. In an example where the optical disk drive 30 supports the Polling mode, the operating system 3 5 periodically issues a GESN command to the drive 30 until the user presses the ejection switch 56 on the drive 30. After the ejection switch 56 is pressed, the drive 30 completes the next GESN command issued by the operating system 35. The drive 30 completes the GESN command by altering the contents of the media status field to reflect the drive's ejection request and reporting the altered media status in a data packet sent to the operating system 35.

Intelligently Processing the Media Event

Once the medium's status has been reported to the operating system 35, the operating system processes the media event reflected by the medium's status as generally described at step 360 on FIG. 3B. FIG. 6 and 7 are flow diagrams illustrating more detailed steps used to process two kinds of exemplary media events.

FIG. 6 is a flow diagram illustrating the preferred steps for processing a media event when a new medium has been placed within the device. Referring now to FIGS. 1–3B, and 6, the method 600 begins at step 605 where the media event is identified from the media status return data as when a new removable medium is placed within the device. In the exemplary embodiment, the media event is also when the new removable medium is in the device and the device is ready to access the new removable medium within the device.

At step 610, the operating system generates a notification message. In the exemplary embodiment, the notification message conforms to an application programming interface called Config_Mgr_Broadcast_Device_Change Message, which is supported by the operating system. At step 615, the generated notification message is issued or broadcasted by the operating system 35 to the file system layer 205 and to all currently running application program modules 36. In this way, each software module receiving the notification message is aware of the new removable medium within the device.

Another media event processed by the operating system 35 is when the device senses an ejection request. Typically, this occurs when the user presses an ejection switch or button associated with the device when attempting to eject the removable medium. However, an ejection request is not be limited to when the ejection switch is pressed. Those skilled in the art will appreciate that an ejection request is when any signal or movement is sensed within the device as an indication that the user is attempting to eject the removable medium. FIG. 7 is a flow diagram illustrating the preferred steps for processing a media event when an ejection request is sensed by the device.

Referring now to FIGS. 1–3B, and 7, the method 700 begins at step 705 where the media event is identified from the media status return data as an ejection request sensed by the device. At step 710, a device driver for the device issues a message called a media removal query. The media removal query informs specific software modules, such as the file system layer 205 and application program modules 36, that a request has been received by the operating system to remove the removable medium from the device. The application program modules 36 are able to respond to the media removal query if any program module still needs access to the removable medium within the device. Additionally, the file system layer 205 is able to respond to the media removal query if any of its file system buffers contain data yet to be written to the removable medium. In this manner, the operating system 35 is able to intervene and verify if ejection of the removable medium at the current time is appropriate, as opposed to having the device automatically eject the removable medium.

In the preferred embodiment, the media removal query is an application-level Plug and Play event message sent from the removable media device's device driver to the file system layer 205 and to any other application program modules 36 currently running in memory. Those skilled in the art will be familiar with messaging details associated with conventional Plug and Play in the "WINDOWS 95" operating system. Additional information regarding Plug and Play event messages is available by referring to "Inside Windows 95" by Adrian King, which is published by Microsoft Press.

At step 715, if ejection of the removable medium has been deemed appropriate (i.e., no data loss will occur and no other program modules need access to the removable medium), then step 715 proceeds to step 720.

At step 720, the operating system 35 is free to issue an EJECTION command to the device. The issued EJECTION command enables the device's ejection mechanism (previously disabled by the persistent lock condition) and allows the device to eject the removable medium at step 725.

However, if ejection of the removable medium has been deemed inappropriate (i.e., data loss may occur or one of the program modules still needs access to the removable medium), then step 715 proceeds directly to step 730.

At step 730, the ejection request is temporarily ignored by the operating system 35. Instead of issuing the EJECTION command, the operating system 35 causes a display dialog to appear on the monitor 47 prompting the user to confirm the ejection request. At this point, if the user had inadvertently caused the ejection request, the user can easily avoid ejecting the removable medium and causing data loss to occur.

At step 735, if the user confirms the ejection request, step 735 proceeds directly to steps 720–725 where the operating system 35 issues the EJECTION command and the device ejects the removable medium. However, if the user does not confirm the ejection request at step 735, the operating system 35 effectively completely ignores the ejection request. This is the situation when the user may have inadvertently pressed the ejection switch on the device to cause the ejection request. By ignoring the ejection request in this situation, the operating system 35 is able to intelligently process such a media event and avoid losing precious data bound for the removable medium. In summary, an embodiment of the present invention provides the operating system 35 decisive control when ejecting removable media based on asynchronous reporting or communication with the device (despite the device's lack of support for conventional asynchronous interrupting of the operating system 35).

Another media event processed by the operating system 35 is when the device senses it is no longer able to access the removable medium without some kind of user intervention (i.e., a media removal event). The operating system 35 is informed of the media removal event via the altered status of the removable medium. Once informed, the operating system 35 typically issues a message to the file system layer 205 and to any application program modules 36 needing access to the removable medium of the situation before displaying a dialog on the monitor 47. The dialog prompts the user for physical intervention assistance in order to re-establish access to the removable medium.

CONCLUSION

From the foregoing description, it will be appreciated that the present invention provides a system and method reporting and communicating a removable medium's status from a memory storage device to the operating system. After it is determined that the memory storage device, such as the optical disk drive 30, supports media status notification, the operating system 35 enables media status notification by sending a PREVENT command to the drive 30. The PREVENT command establishes a persistent lock condition within the drive 30 disabling the ejection mechanism within the drive 30. Once media status notification is enabled, the operating system 35 commences media status notification operation using one of two alternative modes.

In the Asynch mode, the operating system 35 sends a single status command (e.g., a GESN command) to the drive 30. The single status command is stored in a queue pending the occurrence of a media event, such as an ejection request, related to the removable medium in the drive 30. Once the media event occurs, the drive 30 is able to complete the status command by altering the removable medium's status and reporting the altered status within a data packet sent to the operating system 35.

In the Polling mode, the operating system 35 periodically sends status commands to the drive 35. The device ignores the status commands until the occurrence of a media event related to the removable medium. Once the media event occurs, the drive 30 completes the next status command after the media event by altering the removable medium's status and reporting the altered status within a data packet sent to the operating system 35.

Once the operating system 35 receives the data packet having the altered status of the removable medium, the operating system 35 is able to intelligently process the media event, such as the ejection request, without any data loss.

The foregoing system and method may be conveniently implemented in a program module that is based upon the flow diagrams in FIGS. 3A, 3B, and 4–7 and their related descriptions. No particular programming language is required for carrying out the various procedures described above because it is considered that the operations, functions, methods, steps, and procedures described above and illustrated in the accompanying drawings are sufficiently disclosed to permit one of ordinary skill in the art to practice the present invention. Moreover, there are many computers and operating systems which may be used in practicing the present invention and therefore no detailed computer program could be provided which would be applicable to all of these many different systems. Each user of a particular computer will be aware of the language and tools which are most useful for that user's needs and purposes.

The present invention has been described in relation to particular embodiments which are intended in all respects to be illustrative rather than restrictive. The particular embodiment described is one of communicating an optical disk's 31 status from the optical disk drive 30 to the operating system 35 in response to (1) a user's ejection request, (2) the presence of a new medium within the drive 30 or (3) the inability of the drive 30 to access the disk 31. However, those skilled in the art will understand that the principles of the present invention apply to any process that alters and reports the status of a removable medium after any type of media event and in response to an issued command. Furthermore, those skilled in the art will understand that the principles of the present invention are not limited to any particular type of removable media device.

Alternative embodiments will become apparent to those skilled in the art to which the present invention pertains without departing from its spirit and scope. Accordingly, the scope of the present invention is defined by the appended claims rather than the foregoing description.

What is claimed is:

1. A computer-implemented method for managing a removable media device, comprising:

disabling the device from ejecting a removable medium which has been inserted into the device;

issuing a status command to the device to direct the device to enter an asynchronous mode for reporting receipt of an ejection request to an operating system;

receiving the ejection request at the device;

in response to receiving the ejection request, asynchronously reporting the ejection request to the operating system by device;

determining at the operating system if ejecting the removable medium is appropriate; and if ejecting the removable medium is appropriate, then ejecting the removable medium.

2. The method of claim 1, wherein disabling the device from ejecting the removable medium which has been inserted into the device further comprises issuing a prevent command from the operating system to the device.

3. The method of claim 1, wherein the ejection request comprises an indication that an ejection switch on the device has been pressed.

4. The method of claim 1, wherein ejecting the removable medium further comprises issuing an ejection command from the operating system to the device.

5. The method of claim 1, further comprising storing the status command in a queue within the device until receiving the ejection request.

6. The method of claim 1, wherein issuing the status command to the device further comprises:

determining if the device is capable of reporting the ejection request; and issuing the status command to the device only if the device is capable of reporting the ejection request.

7. The method of claim 1, wherein asynchronouly reporting the ejection request to the operating system further comprises sending a data packet having a media status field to the operating system.

8. A computer-readable medium having computer-executable instructions for performing the method of claim 1.

9. A computer system adapted to perform the method of claim 1.

10. A computer-implemented method for managing a removable media device, comprising:

issuing a status command to the device to direct the device to enter an asynchronous mode for reporting an insertion of a removable medium into the device to an operating system;

detecting the insertion of the removable medium into the device;

in response to detecting the insertion, asynchronously reporting the insertion to the operating system by the device; and generating a notification message that the insertion has occurred.

11. The method of claim 10, wherein the insertion of the removable medium into the device completes a replacement of an old removable medium in the device.

12. The method of claim 11, further comprising the step of broadcasting the notification message from the operating system to currently running application program modules.

13. The method of claim 12, further comprising broadcasting the notification message from the operating system to a file system layer.

14. The method of claim 10, wherein issuing the status command to the device further comprises:

determining if the device is capable of reporting the insertion of the removable medium into the device; and issuing the status command to the device only if the device is capable of reporting the insertion.

15. The method of claim 10, further comprising storing the status command in a queue within the device until receiving the insertion.

16. The method of claim 10, wherein asynchronously reporting the insertion to the operating system further comprises sending a data packet having a media status field to the operating system.

17. A computer-readable medium having computer-executable instructions for performing the method of claim 10.

18. A computer system adapted to perform the method of claim 11.

19. A computer-implemented method for managing a removable media device, comprising:

issuing a status command to the device that directs the device to enter an asynchronous mode for reporting a media event to an operating system;

detecting the media event at the device;

in response to receiving at the device the media event, asynchronously reporting the media event to the operating system by the device; and processing the media event with the operating system.

20. The method of claim 19, wherein the media event comprises receiving an ejection request at the device to eject a removable medium which has been inserted into the device.

21. The method of claim 20, wherein he ejection request comprises an indication that an ejection switch on the device has been pressed.

22. The method of claim 21, wherein processing the media event further comprises issuing an ejection command from the operating system to the device in order to eject the removable medium.

23. The method of claim 21, further comprising disabling the device from ejecting the removable medium before issuing the status command, and wherein processing the media event further comprises ejecting the removable medium by issuing an ejection command from the operating system to the device.

24. The method of claim 19, wherein the media event comprises detecting an insertion of a removable medium into the device.

25. The method of claim 24, wherein the insertion of the removable medium into the device completes a replacement of an old removable medium in the device.

26. The method of claim 25, wherein processing the media event with the operating system further comprises:

generating a notification message that the insertion has occurred; and broadcasting the notification message from the operating system to currently running application program modules.

27. A computer-readable medium having computer-executable instructions for performing the method of claim 19.

28. A computer system adapted to perform the method of claim 19.

29. A computer-readable medium having computer-executable instructions for performing the method of claim 23.

30. A computer-readable medium having computer-executable instructions for performing the method of claim 26.

31. A computer-implemented method for managing a removable media device, comprising:

issuing a status command to the device to direct the device to enter an asynchronous mode for reporting receipt of an ejection request to an operating system;

receiving the ejection request at the device;

in response to receiving the ejection request, asynchronously reporting the ejection request to the operative system by the device;

determining at the operative system if ejecting the removable medium is appropriate; and if ejecting the removable medium is appropriate, then ejecting the removable medium.

32. A computer-readable medium having computer-executable instructions for performing the method of claim 31.

33. A computer system adapted to perform the method of claim 31.

* * * * *